J. M. SHARRER.
FOLDING TOP FOR VEHICLES.
APPLICATION FILED JAN. 16, 1913.
1,086,733.
Patented Feb. 10, 1914.
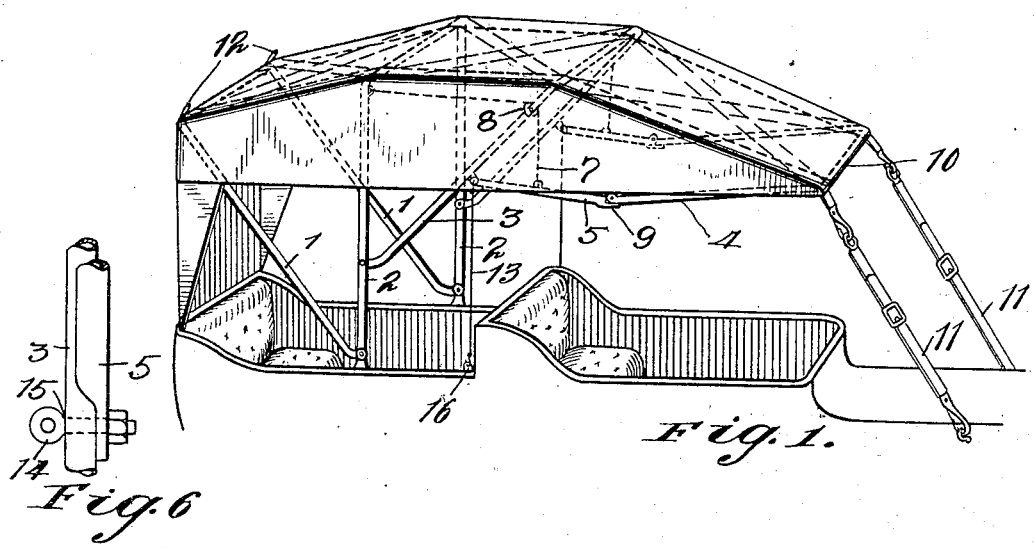
Fig. 1.
Fig. 6.
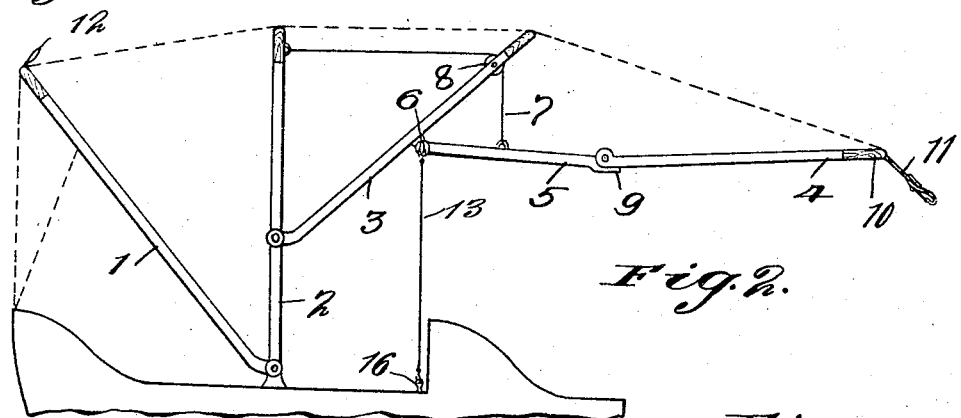
Fig. 2.
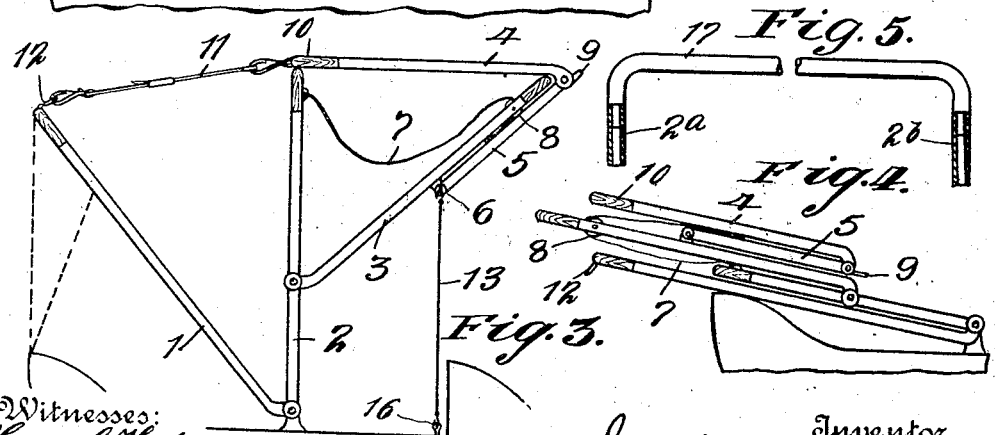
Fig. 3. Fig. 5. Fig. 4.
Witnesses:
Harry C. Heebig
Minnie S. Miller
Inventor
Jacob M. Sharrer
By his Attorneys
Frank H. Ackley

UNITED STATES PATENT OFFICE.

JACOB M. SHARRER, OF NEW YORK, N. Y., ASSIGNOR TO SHARRER PATENT TOP COMPANY, INC., OF NEW YORK, N. Y., A CORPORATION OF NEW YORK.

FOLDING TOP FOR VEHICLES.

1,086,733.

Specification of Letters Patent. Patented Feb. 10, 1914.

Application filed January 16, 1913. Serial No. 742,421.

*To all whom it may concern:*

Be it known that I, JACOB M. SHARRER, a citizen of the United States, and a resident of New York city, in the county of New York and State of New York, have invented certain new and useful Improvements in Folding Tops for Vehicles, of which the following is a specification.

This invention relates to folding tops for vehicles, more particularly automobile touring cars.

In vehicles such as an automobile touring car which requires a long extended top and still leave the view unobstructed, a problem arises how to unfold the top without the driver being compelled to leave the vehicle to perform the unfolding operation and requiring assistance from another person.

The principal object of this invention is, therefore, to provide a folding top for vehicles which may readily be unfolded by the driver alone without leaving his seat in the automobile.

A further object is to provide simple means whereby the forward portion of the top may be rigidly supported without producing undue strain upon the bows.

A further object is to provide a top which may be readily adjusted to a partially unfolded position.

Still further objects and advantages will more fully appear from the detailed description and the features of novelty in construction and combination of parts will be particularly pointed out in the claims.

In the accompanying drawing, Figure 1 is a perspective view illustrating my improved top unfolded or extended in position. Fig. 2 is an elevation illustrating the construction and mode of connection of the bows. Fig. 3 is an elevation illustrating the arrangement and fastening of the bows when the top is in a partially extended position. Fig. 4 illustrates the disposition of the bows when the top is entirely folded. Fig. 5 is a detail view illustrating the construction of one of the bows. Fig. 6 is a detail view illustrating the mode of construction of the links and the forward intermediate bow, with the top in partially unfolded position.

In carrying out my invention, I provide a rear bow extending backward diagonally, an intermediate bow extending upward in substantially vertical position, an auxiliary bow pivoted to the intermediate bow and extending diagonally therefrom in a forward direction, and a front bow having links hinged thereto pivoted to the auxiliary bow. A flexible suspending element is provided for holding up the forward bow. When it is desired to unfold the top, it is merely necessary to grasp the forward bow and to push it forward. This causes the various bows to gradually open up until the entire top is unfolded, whereupon the same may be fastened in position in the usual manner. If it is desired to have the top extend only partly over the vehicle, the forward bow may be turned backward and caused to lie over the rear portion of the top and fastened in this position.

Referring in detail to the drawings, the rear bow 1 extends in an oblique direction rearward and is pivoted in a suitable manner upon the sides of the vehicle. The intermediate bow 2 is pivoted preferably upon the same pivots with the rear bow and extends substantially vertically upward. An auxiliary bow 3 is pivoted upon the intermediate bow some distance above the bottom thereof, and has pivoted thereto a pair of links 5 to which is hinged the forward bow 4. These links are pivoted to the auxiliary bow preferably upon brackets 6 extending therefrom at or adjacent to the mid-length thereof. A flexible suspension consisting of a cord, wire cable, or chain 7 is connected to each of the links 5 intermediate the ends thereof, extends over a pulley 8 mounted adjacent to the upper end of the bow 3, and is fastened to the upper end of the forward bow. The hinged connection between the links 5 and the forward bow 4 includes a finger or lug 9 extending from the links which limits the downward movement of the bow and holds it substantially in horizontal position when the top is unfolded.

In the folded position illustrated in Fig. 4, the intermediate bow lies flat upon the rear bow and the auxiliary bow is flat against the intermediate bow. The links 5 are turned down, thus placing the forward bow 4 in a lowered position to lie snugly over these links and the other bows.

When it is desired to unfold the top, the arch 10 of the forward bow 4 is grasped and turned up and forward. At the beginning of the forward motion, the intermediate and auxiliary bows are moved as a unit until the covering is stretched between the intermediate and rear bows, whereupon the latter is also moved until the rear portion of the top is unfolded. Still further movement causes the auxiliary bow to unfold and also straightens out the links until the covering is stretched tight over the entire top and the forward bow and links being then held by the flexible suspension 7 connected to the intermediate bow. To fasten the top in this unfolded position, the usual straps 11 may be provided to connect with a suitable hook upon the forward portion of the vehicle.

Very often it is desirable to unfold the top only partially, as for instance on a very calm day, when it is desired to get more breeze. For this purpose, I have formed the links 5 of a length at least equal to the distance between their point of connection with the auxiliary bow, to the top of the latter. Thus the forward bow may be swung backward over the intermediate portion of the top and fastened in place preferably by the same straps which are used to fasten the same to the forward part of the vehicle. For thus fastening the top, rings 12 may be provided at the arch of the rear bow. To prevent the entire top from folding back when this intermediate adjustment is made, I provide means for fastening the auxiliary bow to the vehicle, thus holding the entire top firmly in the intermediate adjustment. This latter fastening may consist of a strap 13 provided with a hook which may engage an eye 14 of the pivot pin 15 upon which the links 5 are pivoted to the auxiliary bow 3. The other end of the strap may be hooked into an eye 16 situated at a convenient point on the side of the vehicle.

To make the top light and thus readily adjustable, I preferably form the bows of metal tubing and the arches may conveniently be formed of wooden rods bent into the proper shape and suitably fastened to the tubing. In Fig. 5 is illustrated a fragment of a bow showing the wooden arch 17 fastened to the upper ends of the tubes 2$^a$ and 2$^b$ of the intermediate bow. This construction may be also used for the other bows forming the framework of the top.

It will thus be seen that I have provided a folding top for vehicles which is readily adjusted by the driver within the vehicle from a completely folded position to a completely unfolded position and fastened in the latter position. The movement in unfolding is such as to unfold the bows one by one by a substantially forward movement of the forward bow within convenient reach of the driver. This gradual unfolding renders the manipulation easy, and the mode of connection of the forward bow by the flexible suspension further reduces the laboriousness of the unfolding operation. When it is desired, the top may readily be adjusted to an intermediate position so as to cover only the rear of the vehicle. The top may be fastened in this position to be as rigid as the adjustment thereof in entirely unfolded position.

Having thus described my invention, I claim as new:

1. A folding top for vehicles comprising a rear bow, an intermediate bow, an auxiliary bow pivoted to the intermediate bow, links pivoted to the auxiliary bow, a forward bow hinged to said links and held from downward movement relative thereto, a flexible suspending device fastened to the top of the intermediate bow and to an intermediate point in the length of the links, said flexible device also passing over a projection upon the auxiliary bow.

2. A folding top for vehicles comprising a rear bow, an intermediate bow, an auxiliary bow pivoted to the intermediate bow, links pivoted to the auxiliary bow, a forward bow hinged to said links and held from downward movement relative thereto, a flexible suspending device fastened to the top of the intermediate bow and to an intermediate point in the length of the links, and a pulley attached to the auxiliary bow, said flexible suspending device passing over said pulley.

3. A folding top for vehicles, comprising a rear bow, an intermediate bow, an auxiliary bow pivoted to the intermediate bow, links pivoted to the auxiliary bow, said links being adapted to be turned upward and having a length at least equal to the distance between their point of connection with the auxiliary bow to the top of the latter, and a forward bow pivoted to the outer end of the links whereby the forward bow may be folded backward over the auxiliary and intermediate bows and fastened so as to form an intermediate adjustment for the top.

4. A folding top for vehicles, comprising a rear bow, an intermediate bow, an auxiliary bow pivoted to the intermediate bow, links pivoted to the auxiliary bow, said links being adapted to be turned upward and having a length at least equal to the distance between their point of connection with the auxiliary bow to the top of the latter, a forward bow pivoted to the outer ends of the links, fastening means located at the forward end of the vehicle to which the forward bow may be fastened, and fastening means located at the top of the rear bow for fastening the forward bow for the intermediate adjustment of the folding top.

5. A folding top for vehicles, comprising a rear bow, an intermediate bow, an auxiliary bow pivoted to the intermediate bow, links pivoted to the auxiliary bow, said links being adapted to be turned upward and having a length at least equal to the distance between their point of connection with the auxiliary bow to the top of the latter, a forward bow pivoted to the outer ends of the links, an eye pin forming a pivot for the links to the auxiliary bow, and means engaging the eye pin for fastening and holding the top in intermediate adjustment.

Signed at New York city, in the county of New York, and State of New York, this 11th day of January A. D. 1913.

JACOB M. SHARRER.

Witnesses:
FRANK M. ASHLEY,
GEORGE ISRAEL TUNELL.

Copies of this patent may be obtained for five cents each, by addressing the "Commissioner of Patents, Washington, D. C."